United States Patent [19]

Hagihara et al.

[11] Patent Number: 5,249,172
[45] Date of Patent: Sep. 28, 1993

[54] WRITE LASER POWER SETTING RESPONSIVE TO A SERIES OF WRITTEN TEST SIGNALS HAVING TWO FREQUENCY COMPONENTS

[75] Inventors: Shoji Hagihara, Kawanishi; Masatsugu Tanji, Hirakata; Takafumi Sugano, Katano; Wataru Masuda, both of Hirakata; Hironori Masuda, Hirakata; Hideaki Inoue, Neyagawa, all of Japan

[73] Assignee: Matsushita Electric Industrial Co., Ltd., Osaka, Japan

[21] Appl. No.: 854,366

[22] Filed: Mar. 19, 1992

[30] Foreign Application Priority Data

Mar. 19, 1991 [JP] Japan .................. 3-054536

[51] Int. Cl.⁵ .............................. G11B 7/125
[52] U.S. Cl. ...................... 369/116; 369/48; 369/54
[58] Field of Search .............. 369/116, 47, 48, 50, 369/54, 32, 44.27, 106; 250/205

[56] References Cited

U.S. PATENT DOCUMENTS

| 4,796,097 | 1/1989 | Mashimo et al. | 358/330 |
| 4,979,162 | 12/1990 | Kimoto et al. | 369/116 |
| 5,005,164 | 4/1991 | Sakamoto et al. | 369/48 |
| 5,050,156 | 9/1991 | Barton | 369/116 |
| 5,070,495 | 12/1991 | Bletscher, Jr. et al. | 369/116 |
| 5,134,606 | 7/1992 | Sekiguchi et al. | 369/116 |
| 5,185,733 | 2/1993 | Finkelstein et al. | 369/54 |

FOREIGN PATENT DOCUMENTS

| 58-080138 | 5/1983 | Japan | 369/116 |
| 58-177534 | 10/1983 | Japan . | |
| 59-227043 | 12/1984 | Japan . | |
| 61-122932 | 6/1986 | Japan . | |
| 64-4256 | 1/1989 | Japan . | |

Primary Examiner—Paul M. Dzierzynski
Assistant Examiner—Jim Beyer
Attorney, Agent, or Firm—Ratner & Prestia

[57] ABSTRACT

A write laser power setting device for setting a write laser power for writing data on a recording medium, includes first and second oscillators and for producing carrier signals having high frequencies f1 and f2. The carrier signals are added with each other to produce a sum signal which is applied to a laser driver for producing a laser drive signal. The power of the laser drive signal is changed to various levels. Using the laser drive signal, the write/read head writes test signals at preselected areas on the recording medium such that different writing power levels are applied to different preselected areas, respectively. After writing the test signals, the write/read head reads the recorded test signals. From the read signal, an unwanted signal having a frequency f1−f2 is filtered, and the level of the unwanted signal is detected and stored. A minimum level of the stored levels is selected, and a preselected area at which the minimum level reading is obtained is detected. Then, the writing laser power is set at a writing power level corresponding to the level used for writing the test signal in the detected preselected area.

12 Claims, 6 Drawing Sheets

WRITE LASER POWER SETTING RESPONSIVE TO A SERIES OF WRITTEN TEST SIGNALS HAVING TWO FREQUENCY COMPONENTS

BACKGROUND OF THE INVENTION

1. Field of the Invention

The present invention relates to a device for setting the write laser power for writing a signal to a storage medium, such as an optical disk, by emitting a laser beam, and more particularly, to a write laser power setting device which sets the write laser power for writing frequency modulated luminance signal and chrominance signal in a video signal to an optical disk.

2. Description of the Prior Art

One type of device which writes a signal to a storage medium by emitting a laser beam is the laser writing device that writes a signal to an optical disk. The write laser power setting method applied in this conventional laser writing device is described below with reference to the accompanying drawings.

FIG. 8 is a block diagram of an optical disk recorder using the conventional write laser power setting method. The device comprises a laser drive circuit 4 to modulate the laser, a laser output adjusting circuit 5 that changes the laser power, a disk motor 7 to rotationally drive an optical disk 6, which is the data storage medium, an optical head 8 to write the modulated laser beam to the optical disk 6, a guide rail 9 to guide the movement of the optical head 8, an address read circuit 12 to detect the current read position of the optical head 8 from the signal output by the optical head 8, and a temperature detector 13 to detect the surface temperature of the optical disk 6.

FIG. 9 shows a graph of the relationship between laser power and the location of the optical head 8 on the optical disk 6, at different temperatures.

In a device (CAV) which drives the optical disk 6 at a constant velocity irrespective of the position of the optical head 8, the linear velocity of the optical head 8 relative to the optical disk 6 increases as the optical head 8 approaches the outside circumference of the optical disk 6, and the required write laser power therefore increases. Furthermore, because the optical disk is written by a laser, the required write laser power decreases as the surface temperature of the disk increases. As a result, in the laser writing device as shown in FIG. 8, the laser power adjusting circuit 5 is previously stored with data shown in FIG. 9. In other words, in the conventional laser writing device, the provisional laser power is corrected in two steps, which are: a temperature compensation effected by selecting one of different curves shown in FIG. 9; and location compensation effected by selecting different write laser power according to the selected curve.

However, the following problems are presented by the conventional write laser power setting device.

Due to various factors, such as the deviation of the laser generation characteristics of the laser generator mounted in the head 8, the dust or foreign matter covered on the surface of the laser emitting face, or wear away of the laser generator after a long term use, the optimum laser power as selected by the laser power adjusting circuit 5 may not be optimum laser power.

In addition, it is difficult to accurately detect the temperature of the write film of the optical disk, and there is a certain setting error in the laser power of this device when it is first set.

Therefore, variations in the write laser power, detection errors in the surface temperature, and variations in the laser power setting cause undesirable shifting from the optimum write laser power. Such an undesirable shifting causes bad influence on the written signal, particularly, when the written signal is a combined signal of FM luminance signal and FM chrominance signal wherein two or more different signals are frequency modulated with carriers of two or more frequencies, resulting in moire patterns on screen and thus deteriorate the image quality.

SUMMARY OF THE INVENTION

Therefore, an object of the present invention is to provide a write laser power setting device and method which can always set the optimum write laser power irrespective of variations in the above described various factors.

To resolve the problems incumbent in the prior art as described above, a write laser power setting device according to the present invention comprises: signal writing means for writing a series of test signals at preselected areas on the recording medium, the test signals having two frequency components (f1, f2) and changing its writing power in different levels such that different writing power levels are applied to different preselected area, respectively; signal reading means for reading an unwanted signal component (f1−f2) of the test signal from the preselected areas in the recording medium; memory means for storing the level of the unwanted signals as read from different preselected areas; selecting means for selecting a minimum level of the stored levels of the unwanted signals, and for detecting a preselected area at which the minimum level reading is obtained; and setting means for setting the signal writing means to produce write signals at a writing power level corresponding to the level used for writing the test signal in the detected preselected area.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
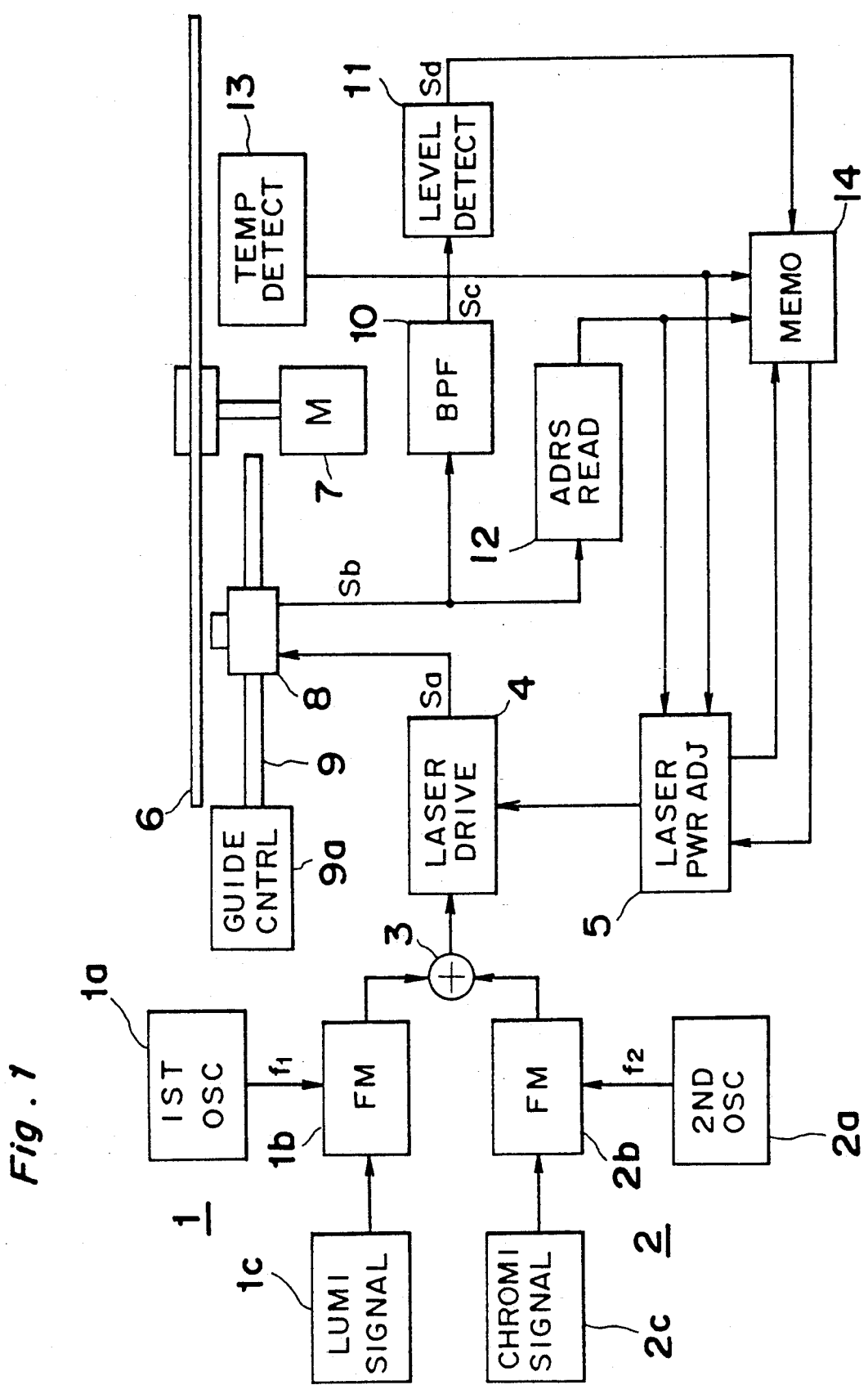
FIG. 1 is a block diagram of a write laser power setting device according to a first embodiment of the present invention.

Referring to FIG. 1, a block diagram of a write laser power setting device according to a first embodiment of the present invention is shown.

The write laser power setting device comprises first frequency signal generator 1 and a second frequency signal generator 2. The first frequency signal generator 1 includes a first oscillator 1a for producing a carrier signal f1 (f1 also represents the frequency of the carrier signal), a luminance signal source 1c and frequency modulator 1b for frequency modulating the luminance signal using the carrier signal f1. The second frequency signal generator 2 includes a second oscillator 2a for producing a carrier signal f2, a chrominance signal source 2c and frequency modulator 2b for frequency modulating the chrominance signal using the carrier signal f2, which has a frequency lower than signal f1.

The device further comprises: an adder 3 which adds the first frequency signal from the first frequency signal generator 1 and the second frequency signal from the second frequency signal generator 2 to produce a sum signal; a laser drive circuit 4 which modulates the laser power by means of the sum signal; a laser power adjusting circuit 5 to adjust the laser power in accordance with a control signal obtained from a memory 14; a disk motor 7 to rotationally drive an optical disk 6, which is an erasable optical disk with plural concentric spiral recording tracks assigned with specific address information; an optical head 8 which writes data to the optical disk 6 using a laser beam powered by the laser drive circuit 4, and which reads the written data; a guide rail 9, coupled with a guide control 9a, to guide the movement of the optical head 8 radially to the optical disk 6; a bandpass filter (BPF) 10 to extract unwanted signal which is a part of the signal read by the optical head 8; a level detector 11 to detect the amplitude of the BPF 10 output signal; an address read circuit 12 to detect from the signal read by the optical head 8 the address of the write track being read; a temperature detector 13 to detect the surface temperature of the optical disk 6; and a memory 14 to store various data, such as the write track address, the detection signal from the level detector 11, the surface temperature of the optical disk 6, and the reference write laser power for the write track address, which represents the radial write position on the optical disk 6, in separate memory areas.

The optical disk 6 used in the present invention has a level testing area at the inside circumference of the disk, such as at tracks 1-30.

Tables 1, 2 and 3 given below show an example of the data stored in memory 14.

TABLE 1

| (Test result data) | | | | | | | |
|---|---|---|---|---|---|---|---|
| Address | 1 | 3 | 5 | 7 | 9 | 11 | 13 |
| Power | 0.8F | 0.9F | 1.0F | 1.1F | 1.2F | 1.3F | 1.4F |
| Level | .4 | .3.8 | .3.5 | .3.1 | .3.3 | .3.5 | .3.7 |
| Temp | .25 | .25 | .25 | .25 | .25 | .25 | .25 |

TABLE 2

| (Location coefficient G) | | | | |
|---|---|---|---|---|
| Address | 1 | 10000 | 20000 | 30000 |
| G | 1 | 1.3 | 1.8 | 2.0 |

TABLE 3

| (Temperature Compensation data $\Delta F_t$) | | | | | |
|---|---|---|---|---|---|
| Temp | 10 | 15 | 20 | 25 | 30 |
| $\Delta F_t$ | +0.1F | +0.05F | 0 | −0.05F | −0.1F |

In Table 1, the data in the shaded boxed, i.e., the level data from the level detector 11 and the temperature data from temperature detector 13, are stored after the test operation, as will be explained below. Other data in Tables 1, 2 and 3 are stored previously.

In Table 2, location coefficients G are given. When the location coefficient G presented in Table 2 is used, the write laser power is gradually increased as the disk address increases greater, that is, as the optical head 8 moves away from the center of the disk. This increase in the laser power is due to the increase of the line speed, as explained below.

Since the angular speed of the rotating disk is constant, the line speed increases as the optical head 8 moves away from the center of the disk. To form pits with constant depth throughout the complete disk, the laser power should increase as the head tracking speed increases. Therefore, Table 2 is provided to gradually increase the laser power as the optical head 8 moves away from the disk center.

The data in Table 2 can be given with a narrower pitch, such as in the order of 1000 tracks.

In operation of the write laser power setting device of the present invention, first, a test operation is carried out using the level testing area in the disk to find an appropriate writing power level, and then the regular writing operation is carried out using the writing area in the disk. Therefore, the circuit of FIG. 1 operates first under the writing level seeking mode, and then, under the regular writing mode.

First, the writing level seeking mode is described. After the disk 6 is mounted, the optical head 8 moves towards the center of the disk by the guide control 9a to have an access to track 1 where the level testing area starts. Also, the first frequency signal generator 1 is so set that the luminance signal source 1c is disabled to provide a plane carrier signal f1 from the first frequency modulator 1b. Similarly, the second frequency signal generator 2 is so set that the chrominance signal source 2c is disabled to provide a plane carrier signal f2 from the frequency modulator 2b. The two carrier signals f1 and f2 are added with each other at adder 3 which then produces a sum signal.

Figure 2A:
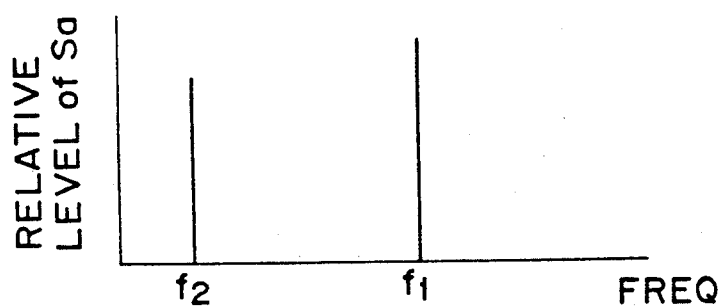
FIGS. 2a, 2b and 2c are graphs showing the signal frequency distribution of signals Sa, Sb and Sc, respectively, shown in FIG. 1.
Figure 2B:
Figure 2C:
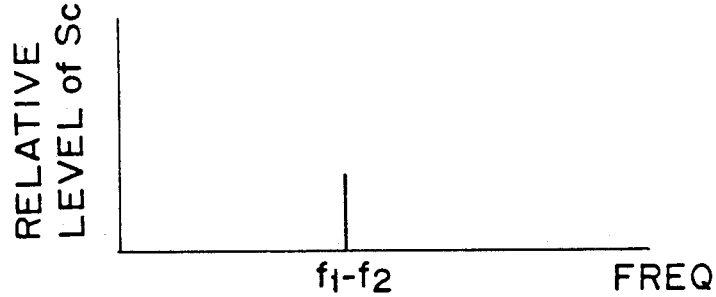
Figure 2D:
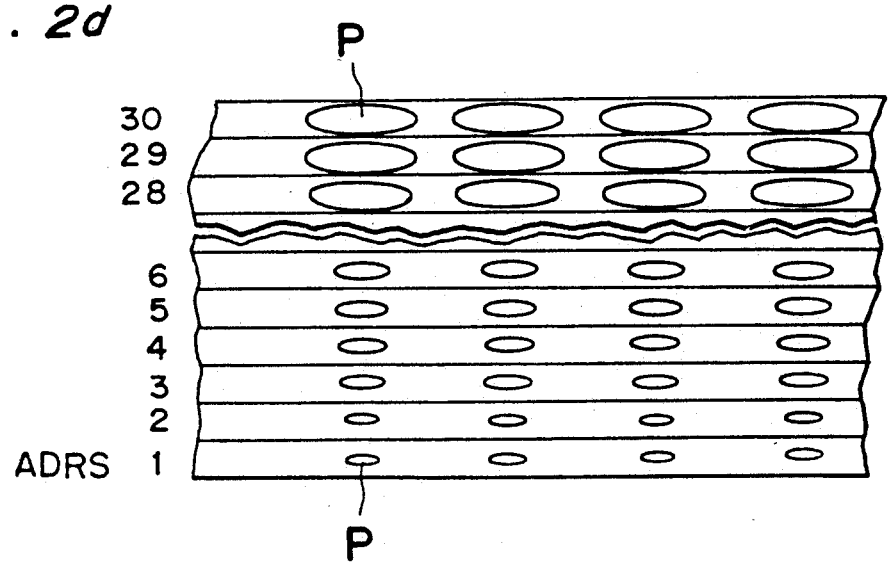
FIG. 2d is an enlarged plan view of a disk surface formed with pits with different sizes.

The sum signal is modulated to a laser signal Sa by the laser drive circuit 4, and the laser beam is produced by a laser generator (not shown) mounted in the optical head 8 which then writes the sum signal in the level testing area at the center of the disk, such as at tracks 1-30. During the writing of the sum signal in the tracks 1-30, the power, or the amplitude, of the laser signal Sa is controlled by a control signal from the laser power adjusting circuit 5, so that the laser power is gradually increased according to a predetermined schedule stored in memory 14. According to the present embodiment, memory 14 is stored with Table 1 which carries track address information 1, 3, 5, - - - , 29 and laser power information that increases gradually as the increase of the address. Thus, by the control signal from laser power adjusting circuit 5, tracks 1 and 2 are written by laser power 0.8 F, tracks 3 and 4 are written by laser power 0.9 F, tracks 5 and 6 are written by laser power F, and so on, to gradually increase the laser power by 10% after every two tracks. Here, F is a provisional laser power selected previously. Other than 10%, the rate of increase can be change to any other desired rate. Thus, the pits P of different size are formed in the tracks 1-30, as shown in FIG. 2d. The aim of the writing level seeking mode is to find a most optimum level of the laser power at the inside circumference of the disk at the detected temperature, so as to produce pits P of an appropriate size, such as pits P with a duty ratio of 50%.

According to the above description, two successive tracks are written. This is to increase the time constant of the detection system and to improve the detection precision.

When the optical disk 6 is driven by the disk motor 7 at a constant rotational velocity, the writing conditions at the inside circumference tracks must be set more precisely because the write density at the inside circumference tracks is greater than that at the outside circumference. Therefore, by providing the level testing area at the inside circumference of the disk, the precision of the write laser power setting at the inside circumference tracks can be increased. However, it is possible to provide the level testing area at the mid circumference of the disk, or at the outer circumference of the disk.

Figure 3A:
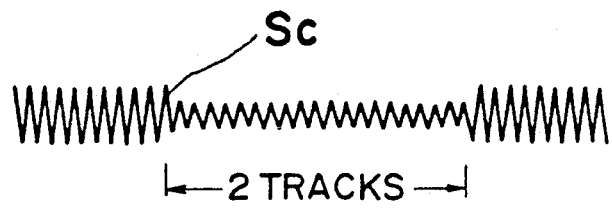
FIGS. 3a and 3b are graphs showing input/output waveforms of a level detector.
Figure 3B:
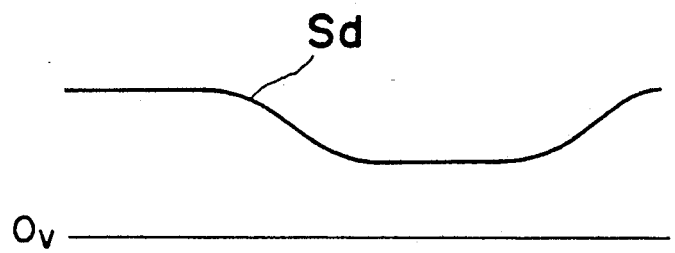

FIGS. 3a and 3b show an example of the input/output signal wave of the level detector 11. When the level testing area is continuously read, the amplitude of the extracted signal Sc with a frequency of (f1−f2) changes every two tracks due to the difference in the write laser power. However, if there are variations in the write sensitivity of the optical disk 6 in the circumferential direction, the amplitude of the extracted signal Sc will also vary within a single track. The time constant of the detection wave of the level detector 11 is increased so that the average value of changes in the extracted signal Sc amplitude can be detected in a single track. Because the changes in the detection signal Sd are fairly gradual, the detection signal Sd in the second of the two tracks written at the same write laser power is defined as the amplitude of the (f1−f2) cross modulation signal component in the reproduced signal Sb. Two tracks are written consecutively for the above reasons, but just one track can be used if there is no problem with the precision of the detection system, and if phase control throughout this one track is possible, the laser power can be changed plural times within the track and the laser power setting time can be decreased.

After the tracks 1-30 are written by the test signals with different amplitude, the optical head 8 returns back to track 1 to read the test signals in tracks 1-30. The read test signal Sb has a frequency spectrum as shown in FIG. 2b containing frequency components of f1, f2, f1−f2 and f1+f2, wherein f1−f2 and f1+f2 are called cross modulation signal components frequencies. The read test signal Sb is applied to the band pass filter 10 which then produces an unwanted signal, i.e., a filtered read test signal Sc which includes only the frequency component of f1−f2 or f1+f2. In the present embodiment, the signal with the frequency component f1−f2 is treated as unwanted signal, as shown in FIG. 2c.

It is to be noted that the signal with the frequency component f1−f2 causes unwanted moire patterns on the screen.

When tracks 1 and 2 are read, the level detector 11 detects an amplitude level of the filtered read test signal Sc, and the detected level is applied to memory 14. In memory 14, the detected level, which is "4" in the present example, is stored in Table 1 at a place corresponding to the tested tracks. In this manner, as shown in Table 1, it is assumed that the levels 3.8, 3.5, 3.1, 3.3, 3.5, 3.7, - - - are detected at tracks 3-4, 5-6, 7-8, 9-10, 11-12, 13-14, - - -, respectively, and are stored in Table 1 in memory 14.

During the detection of the signal level by the level detector 11, the temperature detector 13 detects the surface temperature of the disk and stores the detected temperature in Table 1 at places corresponding to the tested tracks. In the present example, 25° C. is detected.

Since the temperature changes very slowly, the surface temperature can be detected only once in a while such as after every 10 minutes.

Also, to detect the temperature at a spot where the optical head 8 is positioned, it is possible to mount the temperature detector 13 in the optical head 8.

Then, when Table 1 is filled with the laser power level data and temperature data for tracks 1-30, the writing laser power that has produced the minimum signal level of the reproduced f1−f2 component is detected.

Figure 4:
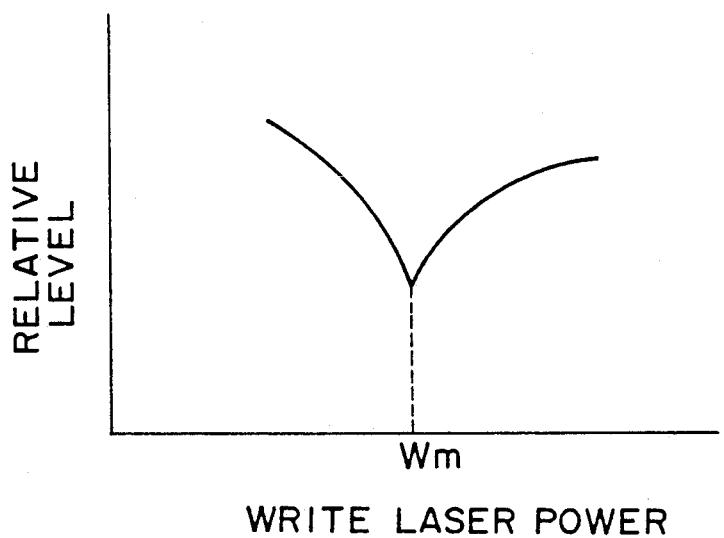
FIG. 4 is a graph illustrating a relationship between the write laser power and the amplitude of the cross modulation signal component of frequency (f1−f2) in the reproduced signal Sb.

FIG. 4 is a graph showing the relationship between the write laser power and the amplitude of the reproduced f1−f2 component, i.e., the cross modulation signal component of a frequency (f1−f2) in the reproduced signal (b). When the amplitude of the reproduced f1−f2 component becomes minimum, optimum pits (having duty ratio of about 50%) are obtained. Thus, the laser power Wm at this point is selected as the optimum laser power to write data at the insider circumference of the disk.

In the above example, the minimum level of the reproduced f1−f2 component is obtained when the write laser power Wm is 1.1 F, at temperature 25° C. When these data (laser power data and temperature data) are obtained, the operation under the writing level seeking mode completes.

Then, the regular writing mode starts. When the mode is changed to the regular writing mode, the first frequency signal generator 1 is so set that the luminance signal source 1c is enabled to provide a luminance FM signal f1 from the first frequency modulator 1b. Similarly, the second frequency signal generator 2 is so set that the chrominance signal source 2c is enabled to provide a chrominance FM signal f2 from the frequency modulator 2b. The two FM signals f1 and f2 are added with each other at adder 3 which then produces a sum signal.

The sum signal as produced from adder 3 is modulated in the laser drive circuit 4 to produce a laser signal Sa. Here, the power of the laser signal Sa is controlled by a control signal from laser power adjusting circuit 5 so that the power of the laser signal Sa is equal to an optimum power Wm, as explained below.

To obtain the optimum power Wm, the provisional laser power F is corrected in three steps, which are: an initial compensation effected by an initial compensation data $\Delta F_i$; a temperature compensation effected by a temperature compensation data $\Delta F_t$ given in Table 3; and location compensation effected by a location coefficient G given in Table 2. First, it is necessary to obtain the initial compensation data $\Delta F_i$.

According to the present invention, the corrected power level Wm is given by the following equation (1):

$$Wm = (F + \Delta F_i)G + \Delta F_t. \qquad (1)$$

Since the result, $Wm = 1.1\ F$, obtained from the writing level seeking mode is the optimum power Wm for writing at the inside circumference at temperature 25° C., it can be said that the result $Wm = 1.1\ F$ has already cleared the three step corrections. Thus, in the above equation, the following data, $Wm = 1.1\ F$, $G = 1$, and $\Delta F_t = -0.05\ F$ are applied.

Thus, by the following calculation;

$$\begin{aligned}\Delta F_i &= Wm - F - \Delta F_t \\ &= 1.1F - F + 0.05F \\ &= 0.15F,\end{aligned}$$

an initial compensation value $\Delta F_i = 0.15\ F$ is obtained.

Thus, for recording the tracks 1-9999, the laser power adjusting circuit 5 produces the control signal to set the writing laser power at:

$$Wm = 1.1\ F.$$

For recording the tracks 10000-19999 ($G=1.3$) at temperature 25° C., the laser power adjusting circuit 5 produces the control signal to set the writing laser power at:

$$\begin{aligned}Wm &= (F + \Delta F_i) \times 1.3 + \Delta F_t \\ &= (F + 0.15F) \times 1.3 - 0.05F \\ &= 1.445F.\end{aligned}$$

However, if the temperature is changed to 30° C. during the writing of the tracks 10000-19999, the writing should be done by the writing laser power at:

$$\begin{aligned}Wm &= (F + \Delta F_i) \times 1.3 + \Delta F_t \\ &= (F + 0.15F) \times 1.3 - 0.1F \\ &= 1.395F.\end{aligned}$$

Similarly, for recording the tracks 20000-29999 ($G=1.8$), the laser power adjusting circuit 5 produces the control signal to set the writing laser power at:

$$\begin{aligned}Wm &= (F + \Delta F_i) \times 1.8 + \Delta F_t \\ &= (F + 0.15F) \times 1.8 + \Delta F_t.\end{aligned}$$

In this case, if the temperature is 25° C., $$\begin{aligned}Wm &= 2.07F - 0.05F \\ &= 2.02F\end{aligned}$$

is obtained, and if the temperature is 30° C., $$\begin{aligned}Wm &= 2.07F - 0.1F \\ &= 1.97F\end{aligned}$$

is obtained.

In this manner, during the regular writing mode, the provisional laser power F is corrected by the use of initial compensation data $\Delta F_i$, the temperature compensation data $\Delta F_t$ and the location coefficient G to obtain the optimum writing laser power Wm at various points on the disk.

In the above embodiment, instead of using equation (1), alternative equation (1a) or (1b) may be used to obtain an optimum writing laser power Wm.

$$Wm = F \times G + \Delta F_i + \Delta F_t \qquad (1a)$$

$$Wm = (F + \Delta F_i + \Delta F_i) \times G \qquad (1b)$$

Figure 9:
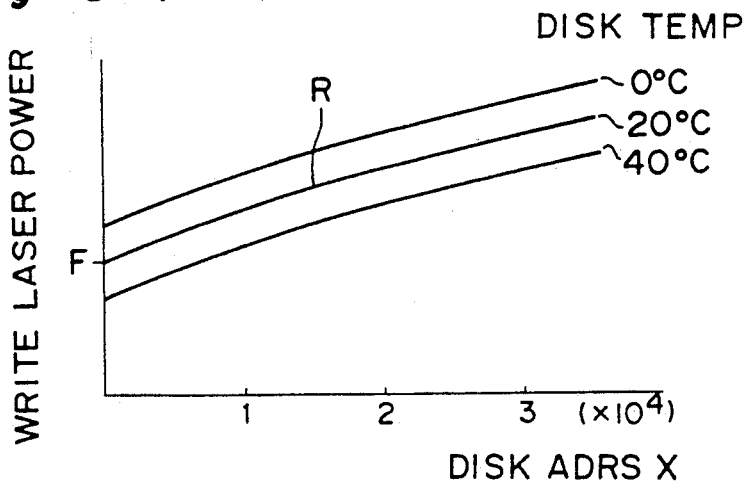
FIG. 9 is a graph illustrating the relationship between the write laser power and the optical head position under different optical disk temperatures.

When the track address X is considered, the equation (1a) can be further modified to equation (2) as follows.

$$Wm(x) = Ws(x) + [W1 - Ws(A1)] + K(T - T1) \qquad (2)$$

wherein Ws(x) is a function representing a standard power, such as a curve R shown in FIG. 9, A1 is the track address where the lowest amplitude of the reproduced f1−f2 component is detected; W1 is the writing laser power as obtained in the writing level seeking mode; T1 is the temperature detected in the writing level seeking mode, T is the temperature detected during the regular data writing; and K is a predetermined temperature coefficient.

When equations (1a) and (2) are compared, a term FxG corresponds to Ws(x), $\Delta F_i$ to [W1−Ws(A1)], and $\Delta F_t$ to K(T−T1). Thus, these equations employ parameters related to the locations on the disk and the surface temperature of the disk.

In the above embodiment, if the difference between the temperature T1 stored in the memory 14 and the surface temperature T of the optical disk 6 measured by the temperature detector 13 immediately before writing exceeds a constant value, e.g., 10° C., it is preferable to repeat the operation under the writing level seek mode. This is because the variation in the temperature coefficient K of the actual write laser power is high due to the optical disk and writing device, and because the write laser power setting error increases when the difference between the temperature T0 during writing to the write laser power setting area and temperature T before actual writing is large.

A laser writing device according to the present invention is thus able to always set the write laser power to a power level resulting in the smallest cross modulation signal component by changing the write laser power to write a sum signal of two different frequencies, measuring the cross modulation signal component included in the playback signal read from the written signal, and setting the write laser power based on the measured result.

Figure 5:
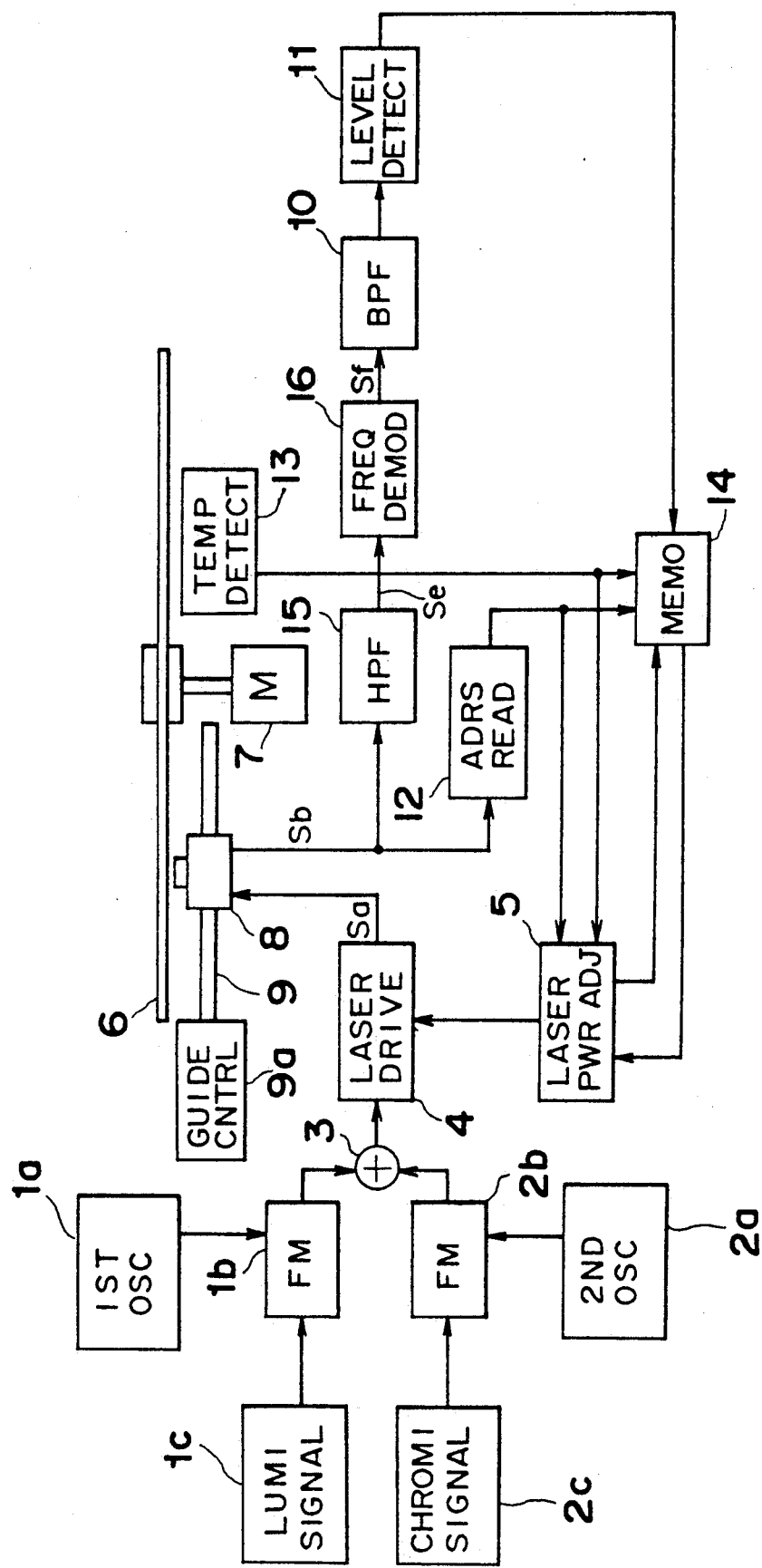
FIG. 5 is a block diagram of a write laser power setting device according to a second embodiment of the present invention.
Figure 6A:
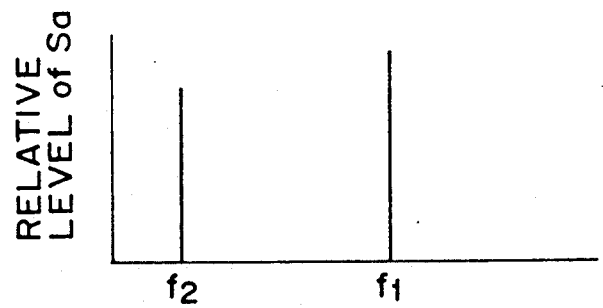
FIGS. 6a, 6b, 6c and 6d are graphs showing the signal frequency distribution of signals Sa, Sb, Se and Sf, respectively, shown in FIG. 5.
Figure 6B:
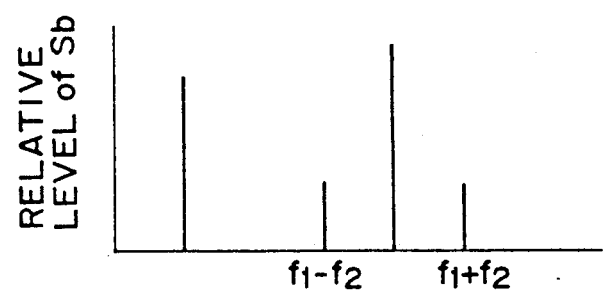
Figure 6C:
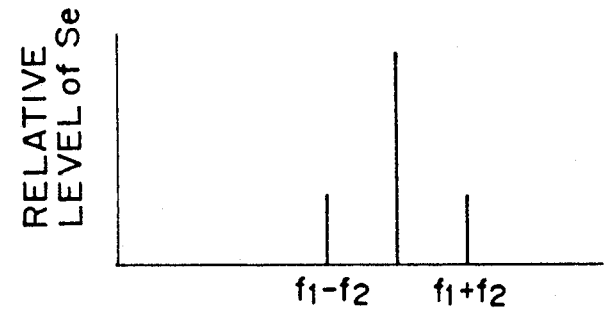
Figure 6D:
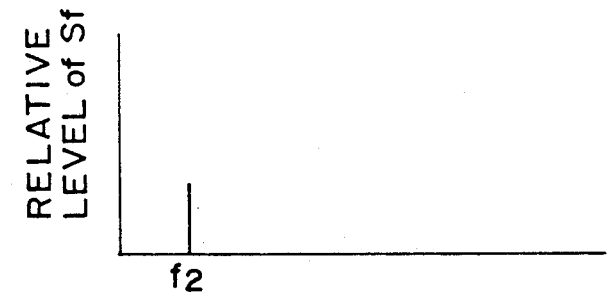

A second embodiment of the present invention is described hereinbelow with reference to the accompanying figures, of which FIG. 5 is a block diagram of a device implementing a write laser power setting method according to a second embodiment of the present invention.

As shown in FIG. 5, this device comprises a first oscillator 1, a second oscillator 2, an adder 3, a laser drive circuit 4, a laser output setting circuit 5, a disk motor 7 to drive the optical disk 6, an optical head 8, a guide rail 9, a BPF 10, a level detector 11, an address read circuit 12, a temperature detector 13, and a memory 14. Each of these components is the same as that of the same reference number in FIG. 1. This second embodiment differs from the first shown in FIG. 1 in the provision of a high-pass filter (HPF) 15 and FM demodulator 16 on the input side of the BPF 10 so that the amplitude of the cross modulation signal component is detected after FM demodulation.

The operation of the laser writing device thus comprised is described hereinbelow with reference to FIGS. 5, 6, and 7.

FIG. 6 shows the signal frequency component distribution of the output terminals of specific blocks in FIG. 5. The written sum signal (a) and the playback signal (b) read from that signal are the same as those shown in FIG. 2. When the signal (d) resulting from extraction of the f2 frequency component by the HPF 15 from the playback signal (b) is demodulated by the FM demodulator 16, the cross modulation signal components of frequencies (f1−f2) and (f1+f2) are converted to the signal component of frequency f2 in the demodulated signal (e), and the amplitude of the signal component of frequency f2 is detected by the level detector 11.

Figure 7:
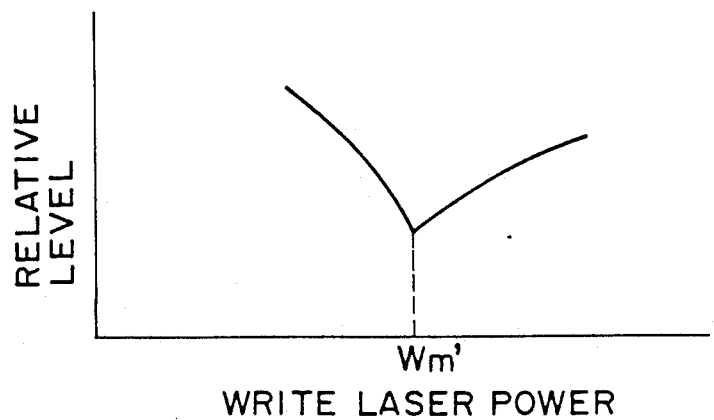
FIG. 7 is a graph illustrating a relationship between the write laser power and the amplitude of the frequency f2 signal component in the FM demodulation signal e.
Figure 8:
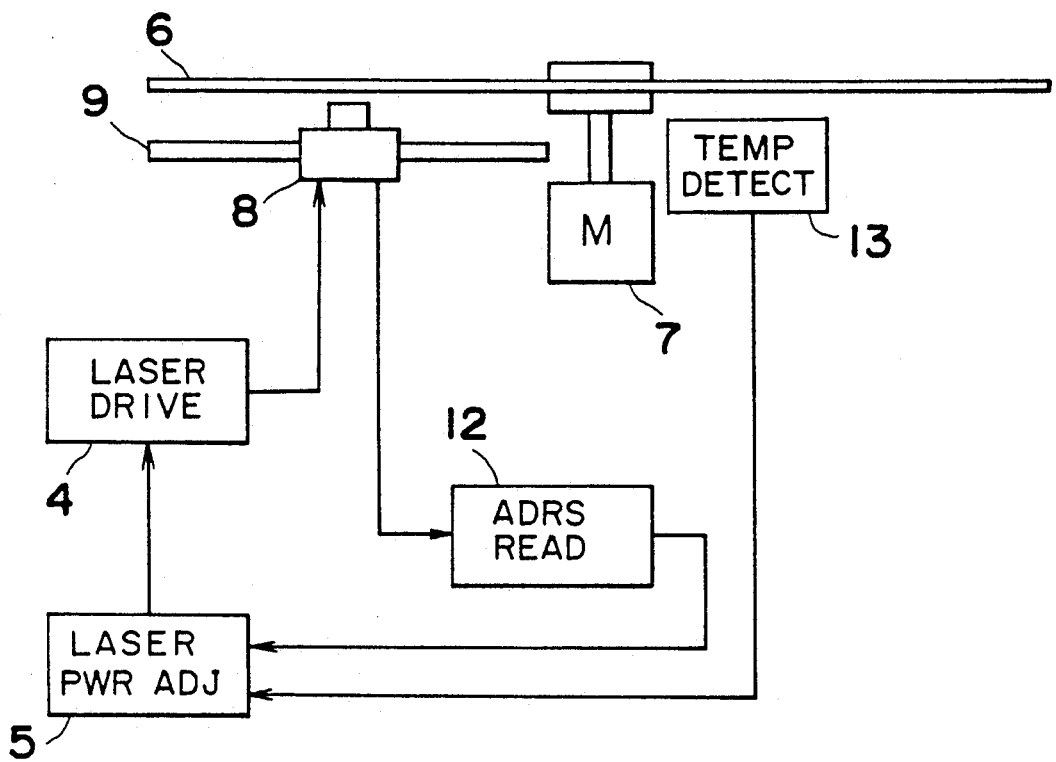
FIG. 8 is a block diagram of a conventional optical disk writing device.

FIG. 7 is a graph showing the relationship between the write laser power and the amplitude of the cross modulation signal component after FM demodulation. Because the cross modulation signal component after FM demodulation is a synthesis signal of the cross modulation signal component of frequencies (f1−f2) and (f1+f2) in the playback signal (b), the write laser power W1 resulting in the lowest amplitude in the cross modulation signal component of frequencies (f1−f2) in FIG. 2 and the write laser power W2 resulting in the lowest amplitude in the cross modulation signal component after FM demodulation will not necessarily match. As in the first embodiment, because the cross modulation signal component after FM demodulation will increase whether the write laser power is less than or greater than W2, by changing the write laser power, including write laser power W2, before and after FM demodulation, the write laser power W2 resulting in the smallest cross modulation signal component after FM demodulation can be detected.

The setting results of W1 and W2 do not always match, but these can be implemented according to the application, with W1 better suited to simple implementations because of its simple construction, and W2 better suited when seeking higher precision to observe the affect on the video signal.

The reference write laser power for a given write track is stored to area two of the memory 14, the amplitude of the cross modulation signal component measured by the level detector 11 after FM demodulation is stored together with the track address and write laser power to area one of the memory 14, and the temperature measured during writing by the temperature detector 13 is stored to area three of the memory 14.

The laser output setting circuit 5 detects the address A2 of the lowest amplitude of the cross modulation signal component measured by the level detector 11 after FM modulation and stored to the memory 14, obtains the write laser power W2 and temperature T2 at that address from the memory 14, and can then obtain the optimum write laser power W(x) by applying, for example, the following equation $$W(x) = Ws(x) + [W2 - Ws(A2)] + K(T - T2) \quad (3)$$

where T is the surface temperature of the optical disk 6 measured by the temperature detector 13 immediately before writing, K is the temperature correction coefficient of the write laser power, and Ws(x) and Ws(A2) are the reference and measured write laser power levels at A2 and a selected address x stored in area two of the memory 14.

However, if the difference between the temperature T2 stored in the memory 14 and the temperature T measured by the temperature detector 13 immediately before writing exceeds a constant value, the write/read operation to the write laser power setting area is executed again as in the first embodiment.

A laser writing device according to the second embodiment of the present invention is thus able to always set the write laser power to a power level resulting in the smallest cross modulation signal component in the FM demodulation output signal by changing the write laser power to write a sum signal of two different frequencies, reading this signal and FM demodulating the read playback signal after extracting the signal component of the low write frequency, measuring the signal component of the extracted signal frequency included in the FM demodulation signal output, and setting the write laser power based on the measured result.

In a video signal recording device which frequency modulates the luminance signal and color difference signal in the video signal, frequency multiplexes and writes these signals, FM demodulates the read playback signal, and restores the luminance signal and color difference signal, the amplitude of the cross modulation signal component after FM demodulation is the amplitude of the FM demodulated color difference signal which appears as interference in the FM demodulated luminance signal, resulting in beat interference on the screen causing severe deterioration in image quality. It is therefore necessary in such devices to set the write laser power to minimize the interference in the FM demodulation output signal.

It is to be noted that while only one area at the inside circumference of the optical disk was used to obtain the optimum write laser power in the embodiments described above, by performing the same evaluation at a site more towards the outside circumference of the optical disk, obtaining a linear or square root curve from the two results, and setting the optimum write laser power based on two or more points on this curve, the laser power can be set even more precisely at each write position on the disk.

Furthermore, it is also possible to obtain the optimum write laser power at the write start position, erase the write track, and then overwrite the track with data rather than provide a special write laser power setting area.

It is to be noted that the present invention was described hereinabove without inputting a video signal, but the same affect can be obtained as described above when a video signal is input. However, because the video signal contains components which are unnecessary for this laser power setting operation, higher precision can be obtained by providing a switch at the input side of the oscillator to cut off the video input when obtaining the optimum laser power setting.

The above embodiments were further described as applying to an optical disk storage medium, but it is to be noted that cards and tapes can also be used in addition to optical disks. In the case of these alternative media, correction of the write laser power according to the write position is not necessary.

The present invention can always write data under optimal conditions even when there is adjustment error in the writing device, variations in the characteristics of the optical disk, and changes in characteristics due to changes in the ambient temperature because the write laser power is set so that the results obtained by reading a signal written under these conditions are optimal by changing the write laser power to write a sum signal of two different frequencies, measuring the cross modulation signal component in the signal obtained by reading the written signal, and setting the write laser power based on the measured result.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A write laser power setting device for setting a write laser power for writing data on a recording medium, comprising:
    signal writing means for writing a series of test signals at preselected areas on said recording medium, said test signals having two frequency components and changing its writing power in different levels such that different writing power levels are applied to different preselected areas, respectively;
    signal reading means for reading an unwanted signal component of said test signal from said preselected areas in said recording medium;
    memory means for storing the level of said unwanted signals as read from different preselected areas;
    selecting means for selecting a minimum level of the stored levels of the unwanted signals, and for detecting a preselected area at which the minimum level reading is obtained; and
    setting means for setting said signal writing means to produce write signals at a writing power level corresponding to the level used for writing the test signal in said detected preselected area.

2. A write laser power setting device for setting a write laser power for writing data on a recording medium, comprising:
    first oscillation means for producing a first signal having a frequency f1;
    second oscillation means for producing a second signal having a frequency f2 lower than f1;
    adder means for adding said first and second signals to produce a sum signal;
    laser drive means for producing a laser drive signal modulated by said sum signal;
    laser power adjusting means coupled to said laser drive means for changing a power of said laser drive signal at various levels;
    writing head means for writing test signals at preselected areas on said recording medium using said laser drive signal such that different writing power levels are applied to different preselected areas, respectively;
    reading head means for reading the recorded test signals;
    filter means for passing an unwanted signal from the read test signals;
    level detecting means for detecting the level of the unwanted signal;
    memory means for storing the level of said unwanted signals as read from different preselected areas;
    selecting means for selecting a minimum level of the stored levels of the unwanted signals, and for detecting a preselected area at which the minimum level reading is obtained; and
    setting means for setting said laser power adjusting means to set the writing power at a writing power level corresponding to the level used for writing the test signal in said detected preselected area.

3. A write laser power setting device as claimed in claim 2, wherein said filter means comprises a band pass filter for passing said unwanted signal which is a cross modulation signal having a frequency f1−f2 from the read test signals.

4. A write laser power setting device as claimed in claim 2, wherein said filter means comprises a band pass filter for passing said unwanted signal which is a cross modulation signal having a frequency f1+f2 from the read test signals.

5. A write laser power setting device as claimed in claim 2, wherein said filter means comprises:
    a high pass filter for passing signal greater than said frequency f2;
    a frequency demodulator for demodulating the signal passed through said high pass filter; and
    a band pass filter for passing said unwanted signal which is a frequency demodulated signal having a frequency f2.

6. A write laser power setting device as claimed in claim 2, wherein said laser power adjusting means comprises a memory for storing a table indicating the preselected areas and corresponding write power levels.

7. A write laser power setting device as claimed in claim 2, wherein said laser power adjusting means comprises a memory for storing a table indicating different areas on said recording medium and corresponding correction coefficients.

8. A write laser power setting device as claimed in claim 2, further comprising a temperature detecting means for detecting a surface temperature of said recording medium.

9. A write laser power setting device as claimed in claim 2, wherein said laser power adjusting means comprises a memory for storing a table indicating different temperatures and corresponding compensation amounts.

10. Method for setting a write laser power for writing data on a recording medium, comprising the steps of:
    writing a series of test signals at preselected areas on said recording medium, said test signals having two frequency components and changing its writing power in different levels such that different writing power levels are applied to different preselected areas, respectively;
    reading an unwanted signal component of said test signal from said preselected areas in said recording medium;
    storing the level of said unwanted signals as read from different preselected areas;
    selecting a minimum level of the stored levels of the unwanted signals,
    detecting a preselected area at which the minimum level reading is obtained; and
    producing said write signals at a writing power level corresponding to the level used for writing the test signal in said detected preselected area.

11. A write laser power setting method as claimed in claim 10, wherein said two frequency components are frequencies f1 and f2, and wherein said unwanted signal is a cross modulation signal having a frequency f1−f2.

12. A write laser power setting method as claimed in claim 10, wherein said two frequency components are frequencies f1 and f2, and wherein said unwanted signal is a cross modulation signal having a frequency f1+f2.

* * * * *